United States Patent
Kalkunte

(10) Patent No.: US 10,455,564 B2
(45) Date of Patent: Oct. 22, 2019

(54) SIMULTANEOUS CHANNEL SWITCHING WITHIN A MESH NETWORK

(71) Applicant: Vivint, Inc., Provo, UT (US)

(72) Inventor: Venkat Kalkunte, Saratoga, CA (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/443,193

(22) Filed: Feb. 27, 2017

(65) Prior Publication Data
US 2017/0238285 A1    Aug. 17, 2017

Related U.S. Application Data

(63) Continuation of application No. 14/200,412, filed on Mar. 7, 2014, now Pat. No. 9,585,109.
(Continued)

(51) Int. Cl.
*H04W 72/04*    (2009.01)
*H04W 56/00*    (2009.01)
(Continued)

(52) U.S. Cl.
CPC ......... *H04W 72/042* (2013.01); *H04W 24/00* (2013.01); *H04W 28/18* (2013.01); *H04W 36/0016* (2013.01); *H04W 36/06* (2013.01); *H04W 56/0005* (2013.01); *H04W 56/0015* (2013.01); *H04W 74/0816* (2013.01); *H04W 76/40* (2018.02); *H04W 8/005* (2013.01); *H04W 84/18* (2013.01)

(58) Field of Classification Search
CPC .... H04L 45/16; H04W 72/042; H04W 84/18; H04W 74/0816; H04W 76/002; H04W 56/0015

USPC ........................................................ 370/350
See application file for complete search history.

(56) References Cited

U.S. PATENT DOCUMENTS 8,027,686 B2    9/2011    Kim et al.
8,040,791 B2   10/2011    Kruys et al.
(Continued)

FOREIGN PATENT DOCUMENTS

EP    1936878 A1    6/2008
EP    2502448 A1    9/2012
(Continued)

OTHER PUBLICATIONS

International Search Report for PCT/US2014024896, dated Jul. 22, 2014.
(Continued)

*Primary Examiner* — Jae Y Lee
*Assistant Examiner* — Jean F Voltaire
(74) *Attorney, Agent, or Firm* — Holland & Hart LLP

(57) ABSTRACT

A computer-implemented method for channel switching in a mesh network is described. In one embodiment, a beacon is sent. The beacon includes a channel change request in both proprietary and standard formats. The channel change request includes an instruction to change to a particular channel and a timing synchronization function identifying when the change to the particular channel should occur. The timing synchronization function is used to determine that the time has arrived to change to the particular channel. The particular channel is changed to synchronously with all other access points in a mesh network.

19 Claims, 11 Drawing Sheets

Related U.S. Application Data

(60) Provisional application No. 61/784,795, filed on Mar. 14, 2013.

(51) Int. Cl.
| | | |
|---|---|---|
| *H04W 24/00* | (2009.01) | |
| *H04W 36/06* | (2009.01) | |
| *H04W 36/00* | (2009.01) | |
| *H04W 74/08* | (2009.01) | |
| *H04W 28/18* | (2009.01) | |
| *H04W 76/40* | (2018.01) | |
| *H04W 8/00* | (2009.01) | |
| *H04W 84/18* | (2009.01) | |

(56) References Cited

U.S. PATENT DOCUMENTS

| | | |
|---|---|---|
| 8,301,190 B2 | 10/2012 | Chandra |
| 9,454,539 B1 | 9/2016 | Shuai et al. |
| 2003/0133409 A1 | 7/2003 | Corazza |
| 2003/0219001 A1 | 11/2003 | de Prado Pavon et al. |
| 2004/0037247 A1 | 2/2004 | Ngo |
| 2004/0063426 A1 | 4/2004 | Hunkeler |
| 2006/0098592 A1 | 5/2006 | Proctor, Jr. et al. |
| 2006/0242457 A1* | 10/2006 | Roy ............... H04W 36/06 714/12 |
| 2006/0281467 A1 | 12/2006 | Kim et al. |
| 2007/0213012 A1 | 9/2007 | Marin et al. |
| 2007/0270102 A1 | 11/2007 | Zhu et al. |
| 2008/0069036 A1* | 3/2008 | Lee ............... H04W 28/18 370/328 |
| 2009/0130980 A1 | 5/2009 | Palanki et al. |
| 2009/0213771 A1 | 8/2009 | Celentano et al. |
| 2009/0323608 A1* | 12/2009 | Adachi ............ H04W 48/18 370/329 |
| 2010/0278127 A1 | 11/2010 | Jeon et al. |
| 2011/0194542 A1 | 8/2011 | Kim et al. |
| 2012/0063410 A1* | 3/2012 | Hong ............... H04W 72/085 370/330 |
| 2013/0051328 A1 | 2/2013 | Chandra |
| 2013/0176925 A1* | 7/2013 | Sampath ........... H04W 52/0209 370/311 |
| 2013/0201980 A1 | 8/2013 | Rahul et al. |
| 2015/0181609 A1 | 6/2015 | Nusairat et al. |
| 2016/0165617 A1 | 6/2016 | Sakamoto et al. |

FOREIGN PATENT DOCUMENTS

| | | |
|---|---|---|
| WO | 2011063175 A1 | 5/2011 |
| WO | 2012150796 A2 | 11/2012 |

OTHER PUBLICATIONS

International Search Report for PCT/US2015/019728, dated Jun. 15, 2015.
Roy, C. et al., "Fast Multichannel Switching for IEEE 802.11s Multiradio Wireless Mesh Networks", Globecom Workshops, 2011 IEEE (Abstract provided), Dec. 2011, pp. 303-308.
Supplementary European Search Report for Application No. EP15761509, dated Jul. 25, 2017. Entire document.
Coleman, D. et al., "Locating and Identifying RF Interfering Devices", CWAP Certified Wireless Analysis Professional Official Study Guide, John Wiley & Sons ProQuest Ebook Central, Chapter 11, Mar. 21, 2011, 7 pp. Entire document.
Cox, D. et al., "Time Synchronization for ZigBee Networks", System Theory, Proceedings of the Thirty-Seventh South Eastern Symposium on Tuskegee, AL, Mar. 20-22, 2005, pp. 135-138. Entire Document.

* cited by examiner

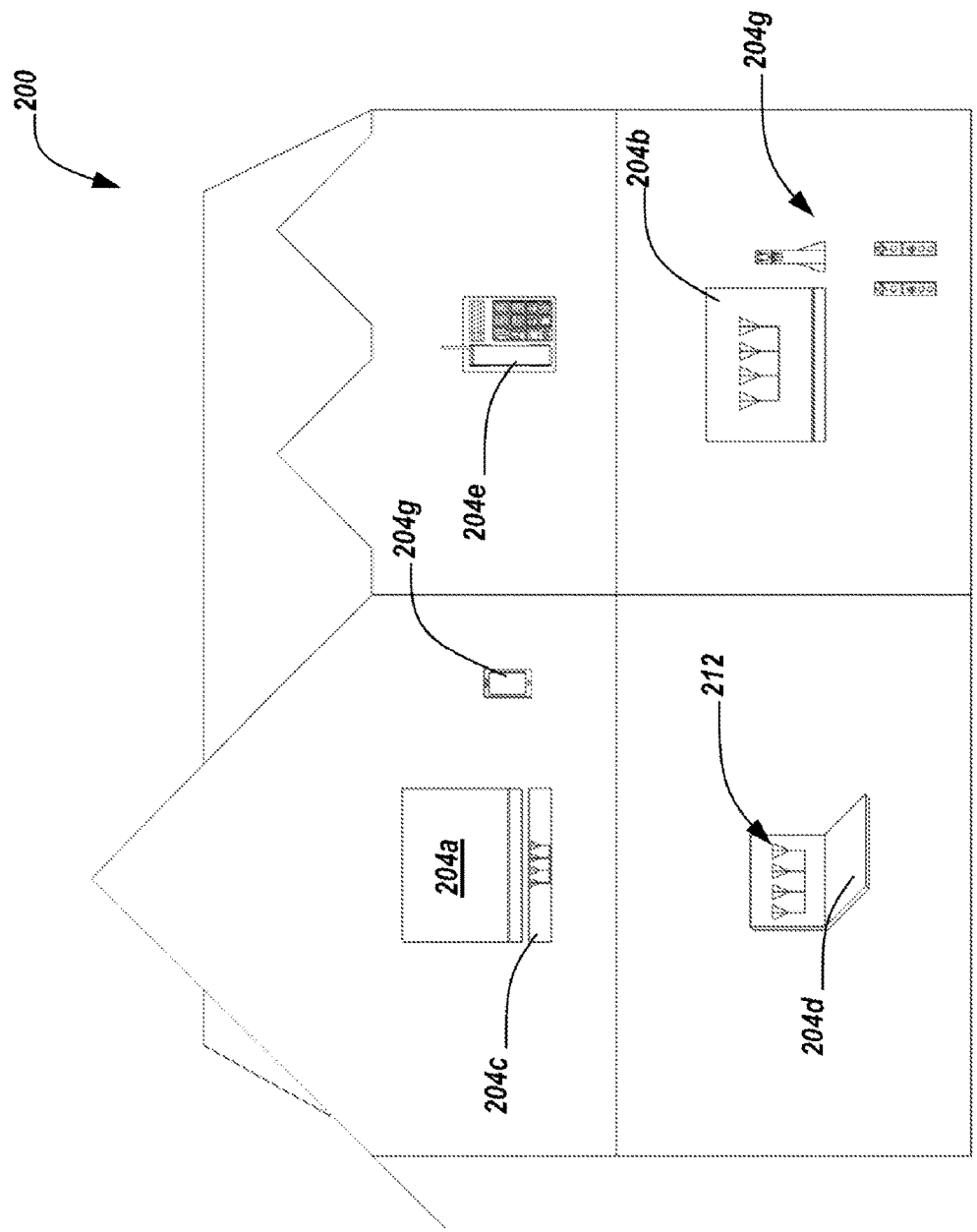

SIMULTANEOUS CHANNEL SWITCHING WITHIN A MESH NETWORK

CROSS-REFERENCE TO RELATED APPLICATIONS

The present application is a continuation of U.S. patent application Ser. No. 14/200,412, titled: "Simultaneous Channel Switching within a Mesh Network," filed on Mar. 7, 2014, which claims priority to U.S. Provisional Patent Application No. 61/784,795, titled: "System For Minimizing Interference Through Simultaneous Channel Switching Within A Mesh Network, And Methods, Devices, Software, And Computer-Readable Media Associated Therewith," filed on Mar. 14, 2013. The disclosures of each of which are incorporated by reference herein in their entireties.

BACKGROUND

When deploying a network, a primary concern is often the amount of bandwidth available to devices within the home network. This concern extends to administrators of commercial, governmental, home, and other types of networks. For instance, in a home network, a user may at times receive multiple streams of video. As high definition video is increasingly available, the user or administrator of the network may want to ensure that the technology used within the home network is sufficient to support the data requirements of multiple streams of high definition video.

Although applicable to all networks, users deploying home networks may also be very cognizant of the cost of deployment. There may therefore be a balance to obtain sufficiently capable technology at the lowest cost. In making that determination, a home network user may select any of several wired technologies to deliver compressed video. For instance, MOCA, HPNA, and PLC may be available. In other embodiments, however, user may opt to use a wireless network. Some wireless networks may expand the coverage area, allow connecting devices to be more portable, and may even be deployable at less of a cost. WiFi (i.e., 802.11 wireless) is often used as a wireless technology capable of provided desired coverage at an economical cost.

WiFi, and particularly 802.11n wireless, may be used to reach virtually any corner of a building, and to connect to a wide variety of devices. Example devices that may use WiFi connectivity include desktop and laptop computers, tablet computing devices, televisions, residential gateways, set-top boxes, game consoles, voice over IP phones, smart phones, and other devices. WiFi is, however, at times unpredictable and unreliable due to the nature of wireless signal propagation and the pervasiveness of interference in the unlicensed spectral bands where WiFi operates.

SUMMARY

According to at least one embodiment, a computer-implemented method for channel switching in a mesh network is described. In one embodiment, a beacon may be sent. The beacon may include a channel change request in both proprietary and standard formats. The channel change request may include an instruction to change to a particular channel and a timing synchronization function identifying when the change to the particular channel should occur. The timing synchronization function may be used to determine that the time has arrived to change to the particular channel. The particular channel may be changed to synchronously with all other access points in a mesh network.

In one embodiment, the timing synchronization function may include information for identifying one or more of the following: a time prior to the time for changing to the particular channel when a transmission queue should be stopped, a time prior to the time for changing to the particular channel when a reception queue should be stopped, a time after the time for changing to the particular channel when the transmission queue should be restarted, and a time after the time for changing to the particular channel when the reception queue should be restarted.

In some embodiments, prior to sending the beacon, a prior beacon may be received. Sending the beacon may be performed by an access point after receipt of a prior beacon that includes the channel change request. Information from the prior beacon may be added into the sent beacon. In some cases, adding information from the prior beacon may include changing the timing synchronization function to account for time differences as a result of at least time to receive and send beacons. In some cases, the change to a particular channel may be registered using a callback function. In some embodiments, one or more operations described herein may be performed by an access point. The access point may include a kernel mode having a proprietary kernel module. In some cases, the standard format may include an implementation in an action frame of 802.11 channel-switch announcement (CSA) elements to allow channel changes by devices that do not have access to the proprietary format.

In one embodiment, prior to sending the beacon, a clear channel assessment request identifying a particular channel for a clear channel assessment may be sent. The clear channel assessment may include information for identifying two or more of identification of a primary channel for the clear channel assessment, identification of a secondary channel for the clear channel assessment, a sampling duration, a sampling period, and a time synchronization function on when to perform the clear channel assessment. In some cases, sending the clear channel assessment request may include adding information from the prior clear channel assessment request. The clear channel assessment may be performed, on all channels, synchronously with other access points in the mesh network. Performing the clear channel assessment may include determining if power on a sampled channel is above or below a power threshold. Performing the clear channel assessment may include measuring how busy the channel is. The busyness of a channel may be inversely proportional to a bit asserted for each sample where power is below a predetermined threshold.

A computing device configured to obscure content on a screen is also described. The device may include a processor and memory in electronic communication with the processor. The memory may store instructions that may be executable by the processor to send a beacon, the beacon including a channel change request in both proprietary and standard formats. The change channel change request may include an instruction to change to a particular channel and a timing synchronization function identifying when the change to the particular channel should occur. The memory may store instructions that may be executable by the processor to use the timing synchronization function, determining that the time has arrived to change to the particular channel and change to the particular channel synchronously with all other access points in a mesh network.

A computer-program product to obscure content on a screen is also described. The computer-program product may include a non-transitory computer-readable medium that stores instructions. The instructions may be executable by the processor to send a beacon, the beacon including a channel change request in both proprietary and standard formats. The change channel change request may include an instruction to change to a particular channel and a timing synchronization function identifying when the change to the particular channel should occur. The memory may store instructions that may be executable by the processor to use the timing synchronization function, determining that the time has arrived to change to the particular channel and change to the particular channel synchronously with all other access points in a mesh network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3B illustrates the building of FIG. 3A, and shows example wireless devices with antennas for receiving communications within a mesh network, according to one embodiment of the present disclosure;

Figure 1:
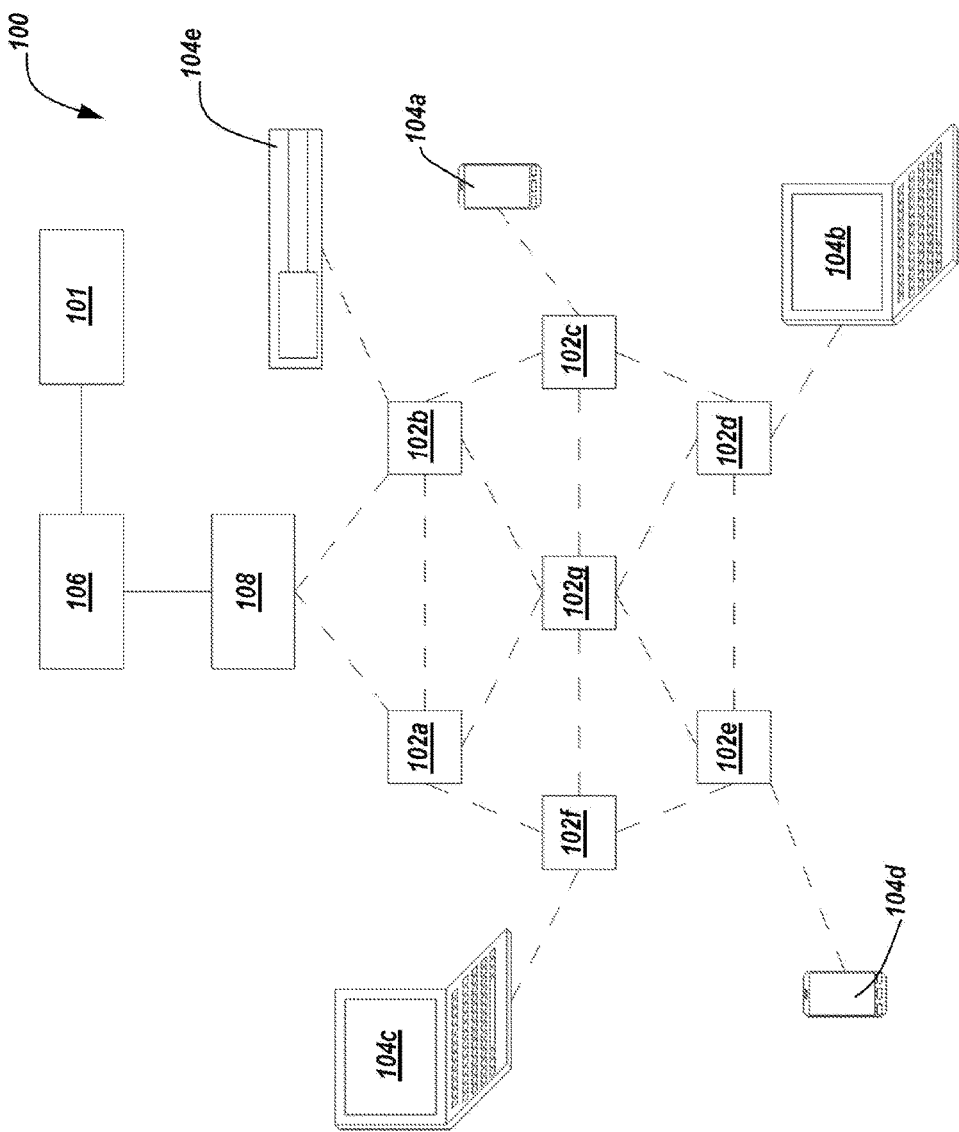
FIG. 1 schematically illustrates an example mesh network according to one embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Systems, methods, devices, software and computer-readable media according to the present disclosure may be configured for use in a wireless communication system. More particularly, systems, methods, devices, software and computer-readable media may be used to maintain reliable communications over extended ranges, and with channel interference resiliency. Without limiting the scope of the present disclosure, some embodiments may specifically relate to providing synchronous and collective changes to communication channels, without disassociation, and in a manner that may reduce dropped packets and interference. In at least some embodiments, availability of other communication channels may be assessed by multiple wireless access points and/or stations in a synchronous manner.

Embodiments of the present disclosure relate generally to wireless communication systems. More particularly, embodiments of the present disclosure relate to systems, methods and devices for mitigating interference and maintaining connectivity within a wireless communication system. More particularly still, embodiments of the present disclosure relate to systems, methods, devices, computer-readable media, and software for resiliently and dynamically adjusting to channel interference to maintain reliability and extend range within a wireless network.

In accordance with some embodiments of the present disclosure, interference is mitigated or avoided by changing the communication channel at each access point, node, or station within a wireless mesh network. Each channel can change the channel simultaneously so as to minimize or eliminate dropped data packets while maintaining an association between access points and stations.

To change channel synchronously, an initiating access point may determine a channel change is desired using clear channel assessment or other measures. A message may be prepared and sent as a beacon, which message can identify the channel to change to, and the time at which the change should occur. A receiving access point may set a timer to make the change at the specified time. The receiving access point may also add the channel change information to an outgoing beacon to allow the message to propagate through the full mesh network prior to the time to change channel occurs.

In accordance with at least some embodiments of the present disclosure, a channel change procedure is based on a clear channel assessment. The clear channel assessment may also be performed by requesting all access points and/or stations within the mesh network perform the clear channel assessment on the same channel or channels, at the same time. Each access point may register its results and report the results. An initiating access point may interpret the results and use the results to initiate a channel change simultaneously at all nodes of the mesh network.

System Overview

To better understand aspects of the present disclosure, FIG. 1 illustrates an example wireless networking system 100 that may be used in connection with some embodiments of the present disclosure. It should be appreciated that the wireless networking system 100 is merely one example of a suitable system for use with embodiments of the present disclosure, and should not therefore limit embodiments described herein to any particular structure.

The wireless networking system 100 of FIG. 1 illustrates an example mesh network that may use multiple nodes, or access points 102a-g, that can collectively route information to any of multiple stations 104a-e or devices. The particular system 100 of FIG. 1 may be dynamic and adaptive to respond to conditions within the network, including interference from any of a variety of sources.

In this particular embodiment, the system 100 may include a service provider 101 which provides network communication services. Although not necessary, an example of a service provider 101 may include an Internet service provider ("ISP"). In such an embodiment, some components of the system 100 may collectively form a local area network (e.g., components 102-108), or other type of network to access data available through the service provider 101 and/or to send information to the service provider 101.

In FIG. 1, the local area network, or other network, may include a distribution switch 106 which communicates with the service provider 101. The distribution switch 106 may communicate with an access switch 108. The distribution switch 106 and access switch 108 may be connected to allow the transfer of communication. The access switch 108 may also connect to one or more access points 102a-g. As noted above, the access points 102a-g may be examples of nodes that can form a mesh network. Through a mesh network, the access points 102a-g may communicate with each other to transfer communications and messages within the network. In some embodiments, any access point 102a-g may be able to communicate with any other access point 102a-g. The access points 102a-g may use wireless communication to communicate. Thus, if two access points 102a-g are unable to communicate, it may be due to factors such as distance or interference (e.g., physical objects obstructing communication), and not necessarily incompatibility.

Any of a number of electronic devices 104a-e may attempt to communicate with the service provider 101. For instance, a computing device (e.g., laptop computing device 104b, 104c) may communicate with the service provider 101. Alternatively, a portable electronic device (e.g., smart phone 104a, 104d) may communicate with the service provider 101. In other embodiments, other devices (e.g., set-top box 104e) may communicate with the service provider 101. Where the access points 102a-g are wireless access points, any or all of the devices 104a-e may be capable of communicating wirelessly with an access point 102a-g. FIG. 1 illustrates, in dashed lines, potential communication links within the system 101, both between access points 102a-g themselves, between access points 102a-g and devices 104a-e, and between access points 102a-g and the access switch 108.

Figure 2:
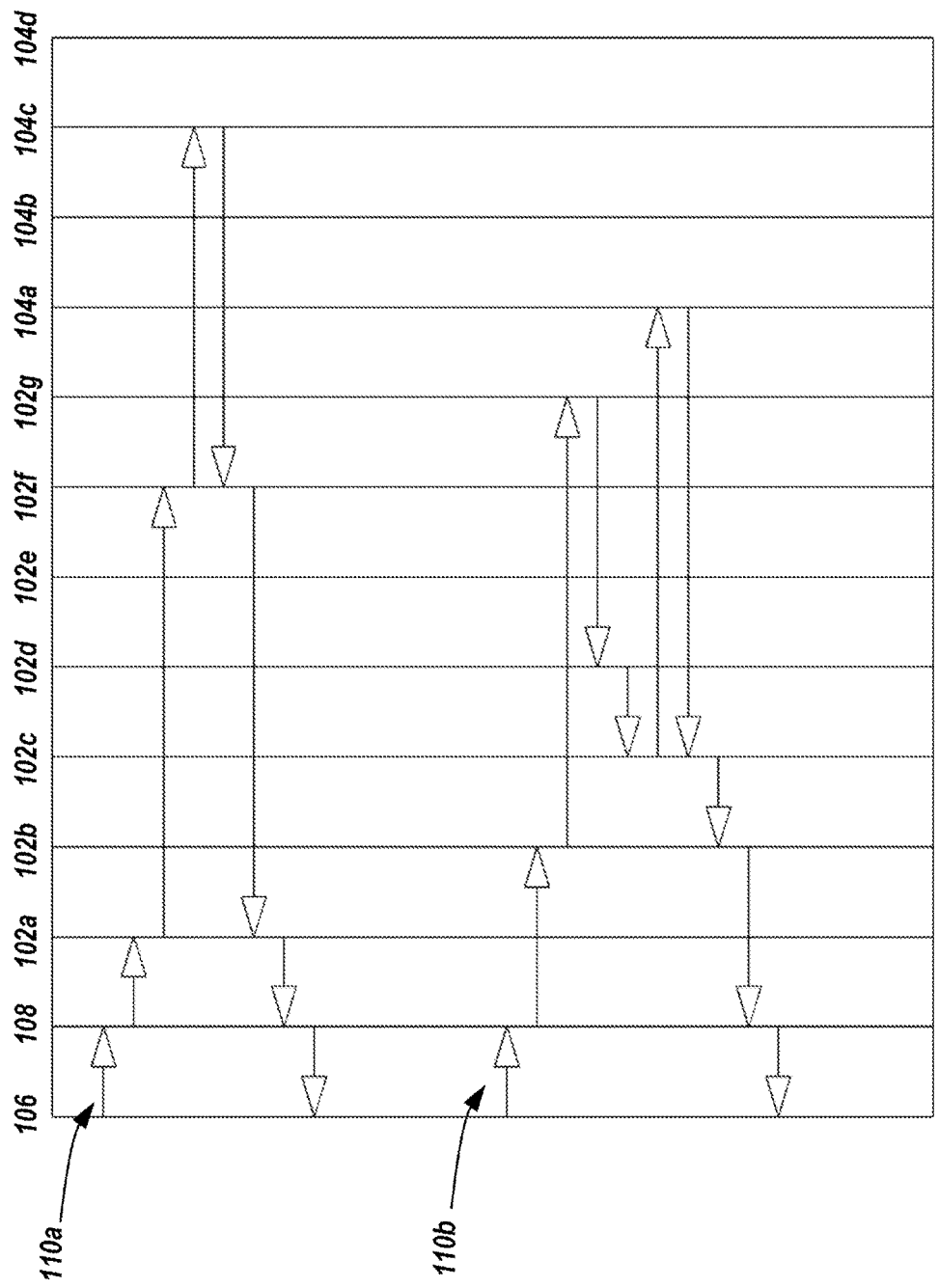
FIG. 2 schematically illustrates example data paths of two signals within the mesh network of FIG. 1, according to one embodiment of the present disclosure.

As discussed herein, the system 100 may be dynamic and adaptive in order to allow communications between devices 104a-e and the service provider 101. An adaptive system may route communications in different manners depending on which device 104a-e is used and/or based on other conditions in the system 100. FIG. 2 illustrates some example manners in which the system 100 of FIG. 1 may be used to pass a set of communications.

In particular, FIG. 2 illustrates two example signals 110a, 110b that may be passed using the system 100 of FIG. 1. A first signal 110a allows the service provider 101 to communicate with a particular device, which in this case may be the laptop computing device 104c. The second signal 110b may also allow communication with the service provider 101, but this example uses communication with the portable electronic device 104a. The routing of the signals 110a, 110b may be different, and may even change, based on conditions within the system, including the locations of the devices 104a, 104c.

A signal intended for a device 104c may be received by the distribution switch 106, and passed to the access switch 108. At that point the access switch 108 may determine which of the nodes 104a-g may be used to pass the information to the device 104c. In this particular embodiment (as shown in FIG. 1), the device 104c may be in communication with a particular node (e.g., access point 102f). Consequently, communication may be routed from the access switch 108, through the access points, until reaching the access point 102f. The access point 102f may then transfer the signal to the device 104c.

FIG. 2 illustrates a particular path the signal 110a may follow. More particularly, FIG. 2 illustrates that the signal may be passed by the access switch 108 to an access point 102a, which can then send the signal to an additional access point 102f. In this case, the access point 102f may be associated with the device 104c, so the device 104c may then receive the signal from the access point 102f. Optionally, a response signal may be sent back to the service provider 101. In this particular embodiment, the signal 110a includes a response which follows the same path back to the service provider 101. Specifically, the signal may be passed from the device 104c to the access point 102f. The access point 102f can communicate the signal to the access point 102a, which in turn communicates the signal to the access switch 108. The access point 108 communicates with the distribution switch 106, which can communicate with the service provider 101 (see FIG. 1).

The second signal 110b may allow communication with a different device 104a, which can potentially be in a different location. Consequently, the communication path used by signal 110b can optionally be different. In particular, the device 104a is shown in FIG. 1 as being associated with an access point 102c, so communication of the signal 110b may pass through the access point 102c.

Transmission of a signal 110b to the device 104a may start similar to signal 110a, and may pass from the distribution switch 106 to the access switch 108. Thereafter, however, the path may diverge. In this particular embodiment, the signal 110b may then be passed, in order, through access point 102b, access point 102g, access point 102d, and access point 102c before being routed to the device 104a. A return path of the signal 110b to the service provider could follow a similar path. In FIG. 2, however, the return path may be different. For instance, an access point may disassociate with the system 100, may be affected by interference, or otherwise be affected. Consequently, a different return path may be dynamically determined. In particular, FIG. 2 illustrates a return path from the device 104a as going through the access point 102c, and access point 102b before being directed to the access switch 108 and distribution switch 106.

The example system 100 of FIGS. 1 and 2 may be used in a variety of different environments. For instance, in at least some embodiments the system 100 may include a network suitable for use in a single building (e.g., home, office, etc.). The use of multiple access points 102*a-g* may allow signals to be re-routed along any of multiple paths to reach a destination. In other embodiments, however, the system 100 may be suitable for use in larger or smaller locations. In an example of a larger system, the service provider may provide broadband or other Internet access to a neighborhood or geographical region wider than a single building. Multiple access points 104*a-g* may be dispersed throughout the geographical region in order to provide Internet access to multiple devices at any of multiple homes, buildings, or other locations. In at least some embodiments, the system 100 may therefore be widely distributed, although such distribution is not required for all embodiments of the present disclosure.

In order to allow communication between the various access points 102*a-g* and devices 104*a-e* of the system 100, each component in a communication path may generally create an association, or communication link, to allow wireless communication to occur. The communication may follow particular protocols and, in at least some embodiments, may use a particular channel or frequency for communication. Each of the components 102, 104 may use the same frequency or channel in order to pass communications.

An example protocol or technology that may be used to pass wireless communications includes WiFi (e.g., 802.11) signals. One aspect of WiFi signals, and virtually all wireless signals, is that they may often be affected by interference. Due to interference, the data rate and reliability of WiFi signals may increase or decrease. In general, as signal power increases, data rate and reliability increase, while decreasing with reduced signal power. Interference reduces the signal power.

Interference that degrades signal quality, and thus data rate and reliability, may come from any number of sources. For instance, signal power may fall off inversely with the distance between wireless components. Thus, a receiver that is located far from a transmitter may receive less signal power as compared to a nearer receiver. With less power, a receiver may not be able to support as high of data rates as a closer-range receiver.

Interference may also come from other sources. Physical objects may, for instance, impede the direct path, or line of sight, of a signal. Signals may be reflected, which can result in a multipath. Reflection of signals can reduce power and re-direct signals, leading to reduced power and dead spots within a network.

Even in the absence of reflection, a wall or other physical objects may also decrease power of a signal. The amount of power loss, or attenuation, may vary based on the type of material. For instance, a home with concrete walls may cause, in some cases, up to 50 dB loss. With such power loss, it may be difficult to maintain a communication link or association between wireless components. In contrast, homes with thinner walls (e.g., wall in homes in Japan), may experience far less signal attenuation.

Other wireless devices may, however, also provide interference. If another device produces a wireless signal in the same or a nearby frequency band, the signals can saturate a receiver and cause excessive noise, thereby degrading performance. The above example of a home with thin walls, for instance, may benefit from less attenuation due to wall thickness, but may also allow more signals from nearby locations to be received at a receiver. Examples of devices that may cause interference in a WiFi setting can include other WiFi networks, microwaves, cordless phones, Bluetooth devices, wireless video cameras, wireless game controllers, fluorescent lights, WiMAX, Zigbee devices, and other devices, or any combination of the foregoing.

Figure 3A:
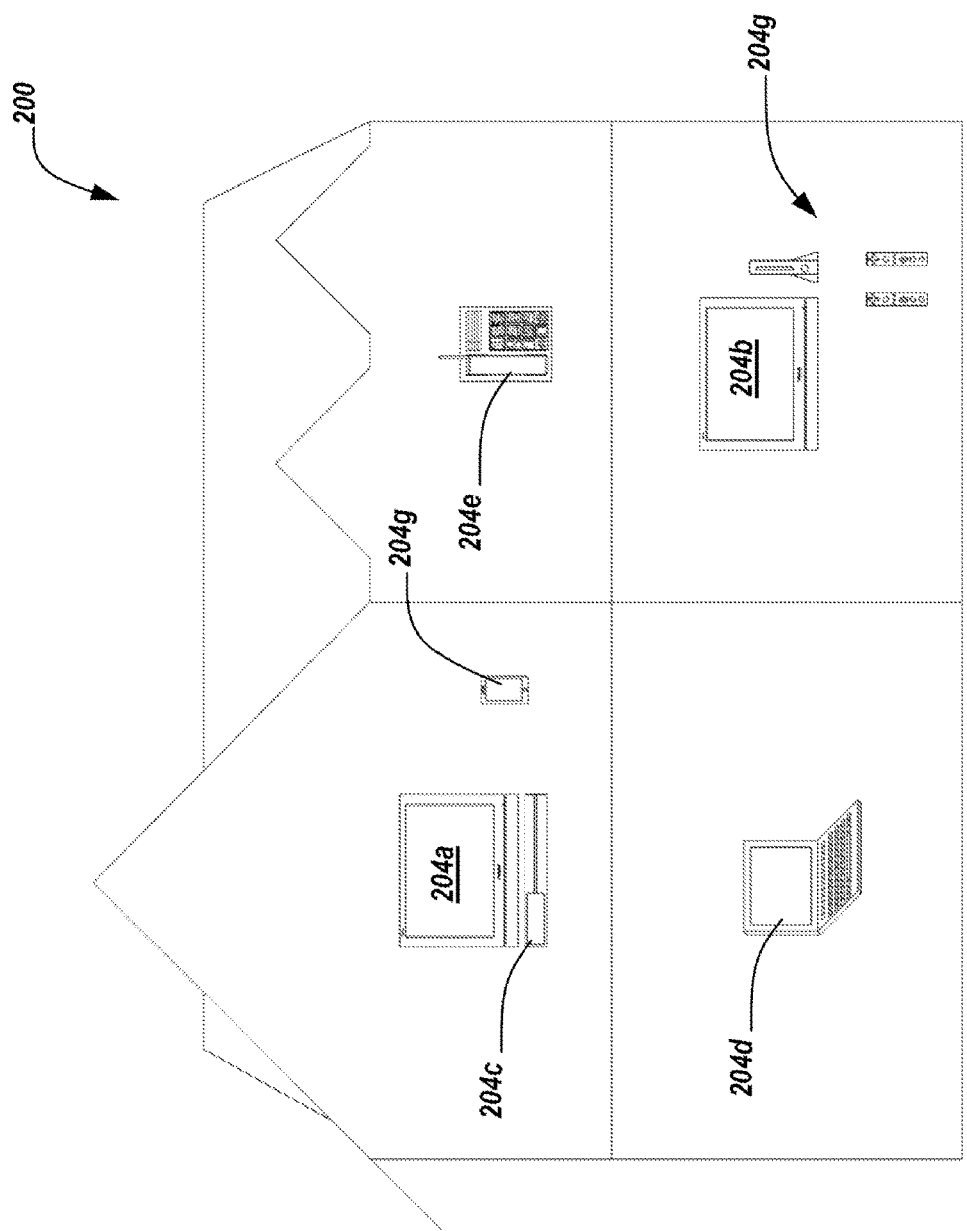
FIG. 3A illustrates a building having multiple wireless devices for receiving data transmitted within a communication network, and additional wireless devices which may provide interference, according to one embodiment of the present disclosure.

FIG. 3A illustrates an example building 200 in which wireless signals may be transmitted, and in which interference may occur. In particular, the building 200 may include various devices 204*a-g* which can operate using, or put off, a wireless signal. For instance, the illustrated building 200 includes two televisions 204*a*, 204*b*, either of which may receive wireless signals over a communication network (e.g., the mesh network 100 of FIG. 1). In this particular embodiment, the television 204*a* may also be connected to a set-top box 204*c* or other similar device, which may also receive wireless signals. A computing device 204*d* in another room may similar connect to the wireless network (e.g., to an access point of the wireless network) to communicate with a service provider or other devices within the system. Other wireless devices in the building 200 include a cordless phone 204*e*, a mobile phone 204*f*, and a gaming system 204*g* having wireless controllers.

In the particular embodiment in FIG. 3A, the wireless signals received by some wireless devices (e.g., 204*a-d*) may be affected by signals of other devices (e.g., 204*e-g*), which can potentially operate using a different network or system. Due to interference, packets of information sent along a WiFi or other network may be lost, or associations between devices and access points may even be lost.

Maintaining a suitable data rate may be increasingly significant as there is a continually rising use of bandwidth. Data rate is dependent on time (i.e., how much data is used over a period of time), and can be particularly affected by large data sets, such as increasingly higher resolution video. This trend can be associated with increased use of flat panel displays of larger size, higher resolution (e.g., 1080i-30 to 1080P-60), higher contrast ratio, higher color resolution, increased dynamic range for high definition content, higher frame rates (e.g., 120/240 frames per second), availability of three-dimensional programming, and the like, or any combination of the foregoing. Although compression (e.g., H.264 compression) allow data to be compressed, high definition video may still use a lot of bandwidth. For instance, high resolution video may still use 30 Mbps or more, as compared to the 8-12 Mbps used by video data of the past.

Embodiments of the present disclosure may allow wireless transmission of large quantities of data, including, but not limited to, high definition video data. Such data can be transmitted in accordance with embodiments disclosed herein by maintaining high reliability and data rates, while also minimizing packet loss, dead spots, and disassociation among wireless access points and devices.

To appreciate some of the manners in which embodiments of the present disclosure may be used, a description of various concepts of the present disclosure will be described in greater detail. Each of these concepts may be used alone, or in combination, in some embodiments of the present disclosure. Thus, while described individually in some cases, it should be appreciated that any concept or feature described herein may be used in connection with any other feature or concept. Example features described include:

Mesh networking;
    Multiple-input multiple-output (MIMO);
    Dynamic Digital Beamforming;
    Receiver processing;
    Fast Channel Switching;
    Clear Channel Assessments; and
    Channel Scanning.

Each of the foregoing is described in greater detail herein.

Mesh Networking

Mesh networking generally includes the use of multiple access points, or nodes, to facilitate communication between different devices or systems. The system 100 of FIGS. 1 and 2 is one example of a mesh network. Mesh networking provides scalability, and may be used with both small and large locations. Thus, a small home may utilize mesh network, as may a larger home, an office building, or even larger locations, all while obtaining nearly 100% wireless coverage.

Mesh networking may also provide dynamic communication. As discussed herein, particularly with respect to FIG. 2, communications may be routed and re-routed based on a variety of conditions. For instance, a receiving device at one location may associate with a particular access point, and communications may pass along one path of different access points to enable communication with another device or a service provider. If the device moves, if a connection degrades, or if another condition occurs, the mesh network may dynamically re-route end-to-end communications to provide suitable reliability and data rates. In some embodiments, each access point may also operate at least partially independently. A mesh network may not use a controller, and may instead allow each access point to use point-to-point or point-to-multipoint communications to pass signals.

MIMO

MIMO refers to the use of multiple inputs and multiple outputs in the context of a radio channel carrying a signal. For a MIMO system, various devices may include multiple antennas that are used to transfer signals between transmitters and receivers. Each access point, end-user device, or other components in the system may act as both a transmitter and/or receiver in certain embodiments. MIMO may provide the ability to increase data rates, range, and reliability, all while not utilizing additional bandwidth or substantially, if at all, increasing transmission power.

To use MIMO, the multiple antennas may use channels independently, so as to send multiple data streams. FIG. 3B, for instance, illustrates the building 200 of FIG. 3A, but illustrates various devices as including multiple antennas 212. In this particular embodiment, the television 204b, set-top box 204c, computing device 204d, and gaming system 204g may each have multiple antennas 212 for use in connection with a MIMO system.

In general, the number of antennas 212 used may be configurable, and can change according to system requirements, cost concerns, or the like. Each antenna may, however, support an independent data stream, and more antennas may thus increase the number of independent data streams available. A 2×2 MIMO system may include two antennas at the transmitter and two antennas at the receiver, and can support two independent data streams. Similarly, a 3×3 MIMO system may support up to three independent data streams, and a 4×4 MIMO system can support four independent data streams.

Dynamic Digital Beamforming

Figure 4A:
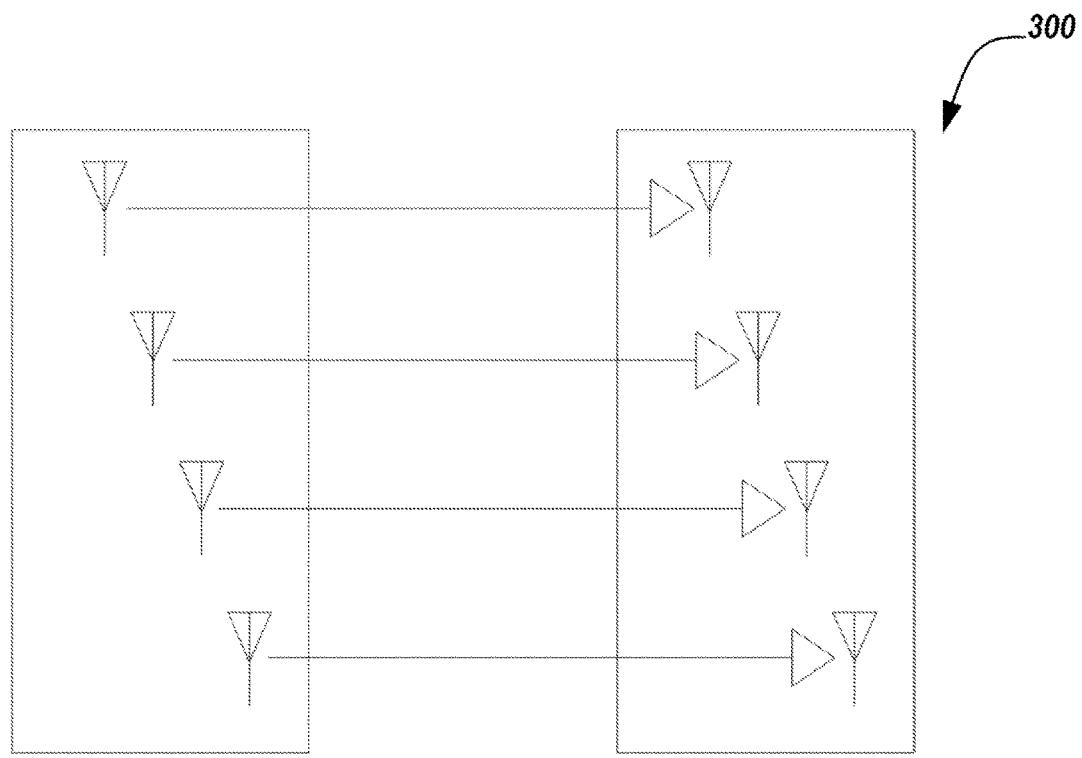
FIG. 4A schematically illustrates an example communication system in which two devices with four antennas may maintain four independent data streams, according to one embodiment of the present disclosure.
Figure 4B:
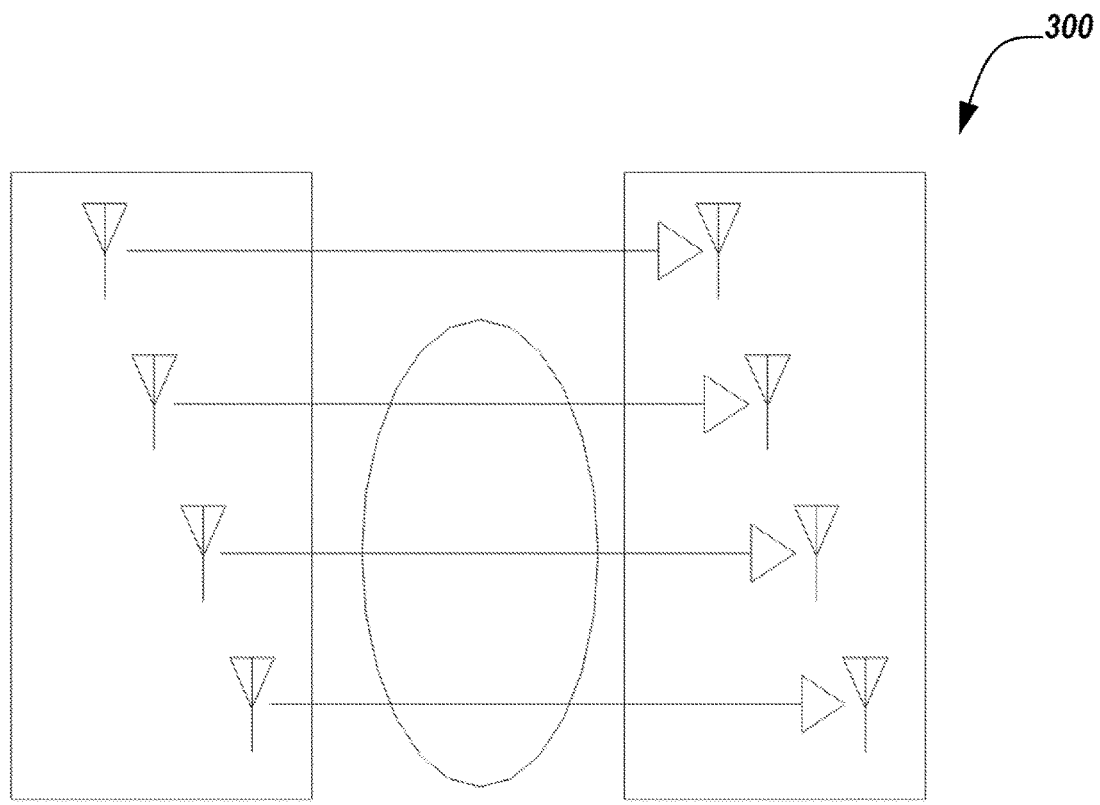
FIG. 4B schematically illustrates the example communication system of FIG. 4A, in which the antennas of the devices may use beamforming to combine data streams, according to one embodiment of the present disclosure.

Dynamic digital beamforming ("DDB") may relate to the use of antennas to focus energy between devices on a per-packet basis. More particularly, DDB may take advantage of directional or spatial knowledge in order to focus radio in a particular direction. A signal may be sent, for instance, by each of two antennas. Where the signals overlap, signals may be amplified. Steering signals, delaying signals from one antenna, and the like may therefore direct the amplification to a particular location and/or distance. FIG. 4A schematically illustrates an example 4×4 MIMO system 300 which can send independent streams, and FIG. 4B illustrates the same 4×4 MIMO system 300 with DDB used to effectively combine streams and provide enhanced reliability.

DDB may be used in connection with MIMO to obtain some additional gains in reliability and/or data rate. In a 2×2 MIMO system, for instance, two data streams may be provided; however, with no additional antennas there may be marginal benefits to the two data streams. In contrast, a 3×3 MIMO system may also support two data streams, but can include an additional antenna. That additional antenna may allow more beamforming to take place, thereby providing added reliability. Further improvement can be seen in a 4×4 MIMO system that includes two additional antennas beyond those used for two data streams. In a 4×4 MIMO system, the two additional antennas allow focusing of energy in two directions, and some embodiments can provide gains of 12-25 dB, or more, relative to signals sent without beamforming.

In general, the more antennas that are provided, the more antennas can be used for providing independent data streams and/or for beamforming. Additional antennas may thus provide additional spatial dimensions to be combined and to provide greater reliability.

While additional antennas may be used, it may not be necessary, or even desirable, to continually increase the number of antennas. For instance, if a single data stream is provided, two antennas may provide nearly 100% reliable use. Similarly, if two data streams are to be supported, four antennas may provide nearly 100% reliable use. Table 1, below, summarizes the reliability of various systems that include both MIMO and DDB.

TABLE 1

| Configuration | 2 × 2 | 3 × 3 | 4 × 4 |
| --- | --- | --- | --- |
| % of channels supporting 1 max-rate data stream | 99.5% | 100% | 100% |
| % of channels supporting 2 max-rate data streams | 4.4% | 68.1% | 99% |

DDB can be used by applying weight factors to each antenna, to thereby steer energy in an independent spatial direction associated with the data stream, while avoiding interference. Channel estimation can be used, and may be explicit or implicit. For instance, explicit feedback of the weights and channel estimates may be received from a receiver. In other embodiments, metrics such as minimizing packet error rate may be used to obtain implicit feedback on the weight factors being applied. DDB may also provide enhanced flexibility as the weight factors can be changed based on the feedback. In contrast to switched beamforming, which limits switching between fixed antenna patterns pointing in a single spatial direction, weight factors can be varied in any desired manner.

Receiver Processing

Receiver processing may be used in connection with MIMO and/or DDB to further provide improved throughput, range, and/or reliability of a wireless signal. In some embodiments, the antennas may be optimally adapted to the characteristics of MIMO channel frequency response, the number of data streams, and the receiver positions. For instance, in a 4×4 MIMO system, two extra antennas (assuming 2 independent data streams are supported), may focus energy in two directions to reduce interference and move the signal away from other locations.

In particular, while DDB may use additional antennas to steer transmitted data in a particular spatial direction, receiver processing may apply weight factors to antenna inputs to steer an array pattern in the direction of detecting and receiving an incoming data stream. Combining receiver processing and DDB may therefore collectively steer and receive data streams in an optimal manner to produce increased throughput, reliability, and range.

Another aspect of receiver processing may be the ability to counteract interference. When weight factors are applied, weighting may place nulls in the directions of interference sources. Thus, a 4×4 MIMO system providing two extra antennas can potentially null-out two interference sources. Nulling an interference source may, however, change the ability to steer an array in the direction of an incoming data stream. For instance, if one antenna is used to null an interference stream, it may be unable to also steer an array toward an incoming data stream, leaving only one antenna to do so. Receiver processing can thus optimize performance by combining nulling out interference and maximizing received signal power by steering an array toward incoming data streams. In some embodiments, receiver processing may suppress interference effects so that transmitted signals in the spatial direction are orthogonal to that of interference sources.

Figure 5:
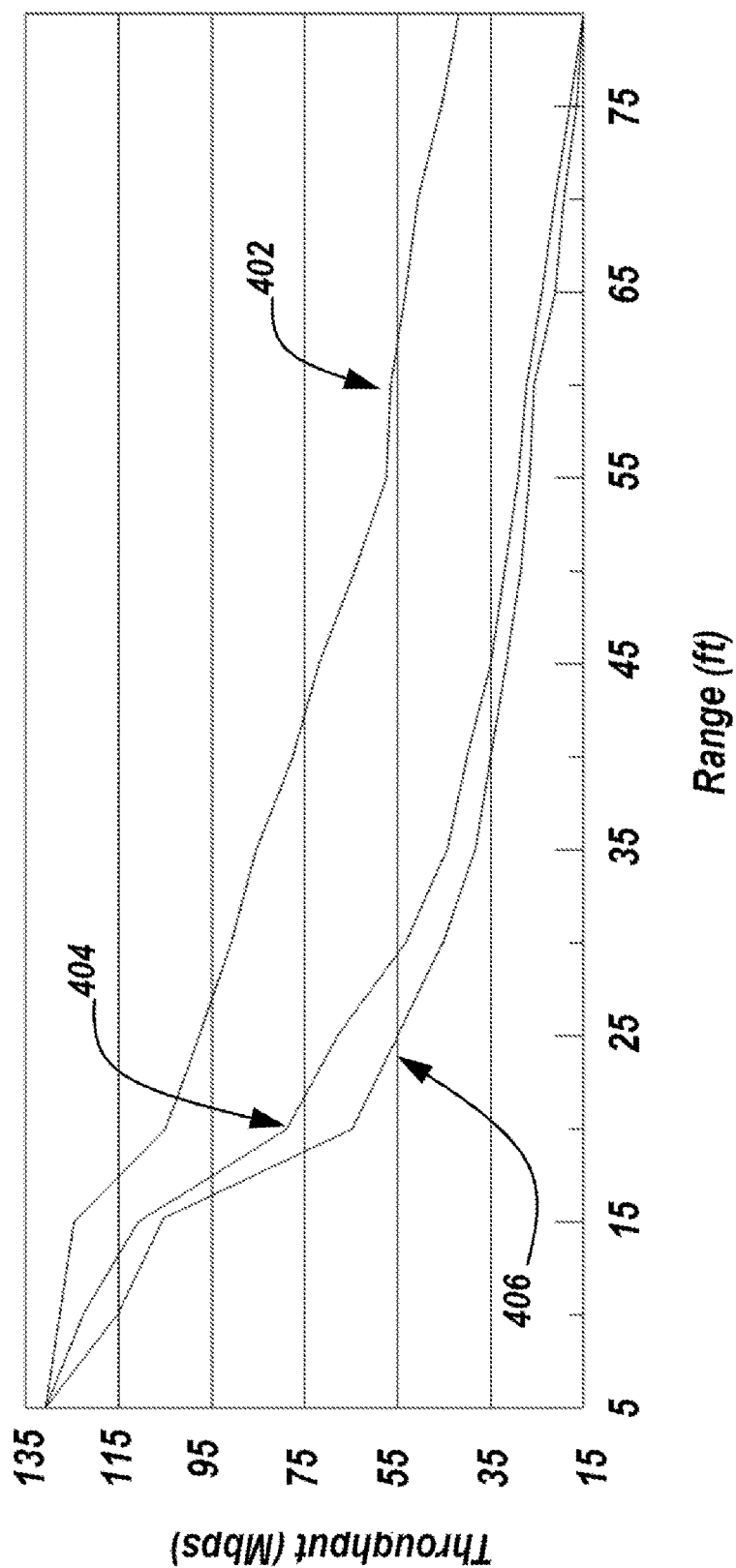
FIG. 5 graphically illustrates a comparison of throughput for a 4×4 MIMO system with beamforming relative to two different 3×3 MIMO systems, according to one embodiment of the present disclosure.

Combining MIMO, DDB, and receiver processing can provide significant gains over systems lacking any or all of such components. FIG. 5, for instance, illustrates an example graph representing the average throughput of various systems. The graph illustrates throughput as it relates to distance or range. A first condition 402 represents a 4×4 MIMO system with adaptive processing in transmit and receive antenna arrays (i.e., using DDB and receiver processing), and shows significant gains relative to 3×3 MIMO systems with switched beamforming (condition 404) and without any beamforming (condition 406).

Fast Channel Switching

As discussed herein, embodiments of the present disclosure may include use of a wireless communication system in which multiple nodes and/or devices associate over wireless communication links. The communication links may then be used to transfer information within the network. Optionally, the network includes components discussed above, including mesh networking to reach difficult to reach locations using mesh elements between transmitters and receivers. Other features may include MIMO (e.g., 4×4 MIMO) that enables DDB with explicit or implicit channel estimates to obtain multiple data streams at high channel level gain and low interference over longer distances, with maximized gain in the direction of the incoming data streams. Receiver processing may also be used to null out interference sources, to steer an array toward an incoming signal, or some combination thereof.

When communicating wirelessly, the various components may communicate over a particular channel or frequency within a frequency band. In a wireless chipset, the radio channel that is used may become congested or over-subscribed. In a mesh network, mesh points may begin to lose connection to an access point. Those who lose a connection may be considered to be on the so-called "cell edge," and can become inaccessible. In an example home security setting, a video surveillance camera at a cell edge may become disassociated with an access point, which can cause a loss of signal, making it impossible to monitor the video.

Certain aspects of the present disclosure may relate to changing channels to maintain reliability, data rates, and range. A channel change may be performed in response to detecting interference (e.g., explicitly or implicitly), although a channel may be changed for any number of reasons as well.

Figure 6:
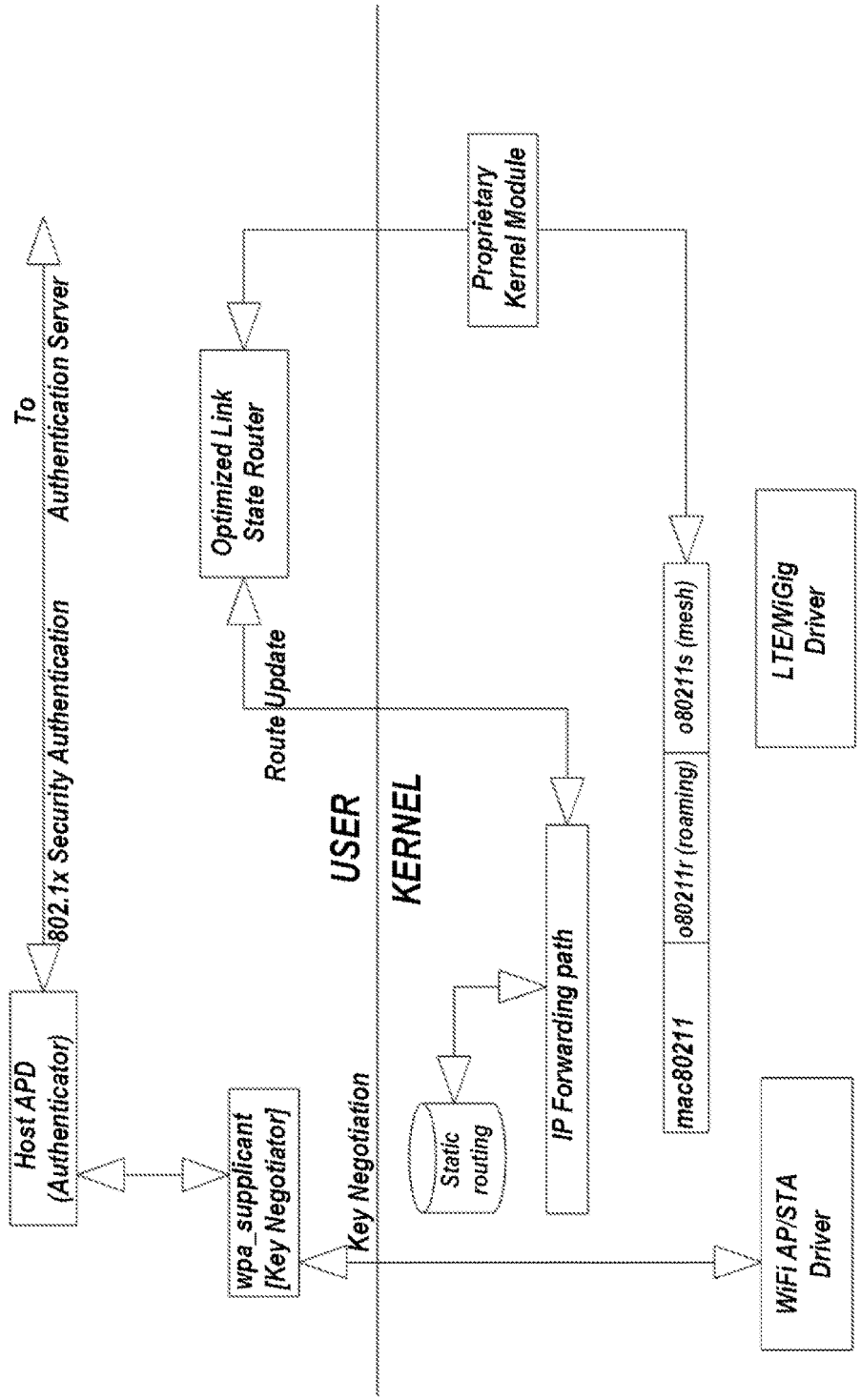
FIG. 6 illustrates an example access point including user and kernel modes, the kernel mode including a proprietary kernel module for communicating channel change and clear channel assessment messages, according to one embodiment of the present disclosure.

According to some embodiments of the present disclosure, a single radio channel can be shared among multiple mesh peers, and potentially among other end-user or other devices, which can be considered "stations". Each mesh peer, or access point, may have user and kernel modes where certain actions can be initiated, registered, or otherwise processed. FIG. 6 illustrates an example of one type of a system that may be used, and which includes both kernel and user modes. As illustrated, a proprietary kernel module is included in the kernel mode. The kernel module may be used, in some embodiments, in a communication path between a link state router (e.g., in the user mode) and an 802.11 module.

According to some embodiments of the present disclosure, the kernel module may be used to apply a channel change as a countermeasure (e.g., when a signal degrades) or take other actions (e.g., to test the state of a mesh or communication link, test availability of other channels, etc.). One mechanism that may be used by the kernel module may be to utilize open shortest path first ("OSPF") protocols, and to set Hello protocol timers. Optionally, IGMP snooping may be disabled in the kernel module to facilitate flow of protocol timers, which can act as a primary trigger to make hidden nodes visible. The kernel module may provider simpler, specific, and stable interfaces at all access points or other nodes in order to facilitate such actions. Collectively, such features provide flexibility to recover and regain original communication links.

The kernel module may be used in some embodiments to change channels in a manner that allows access points and other stations to maintain associations with potentially no lost packets. This may be done by allowing all access points to switch to the same channel, in sync with a parent access point, which may be a peer access point who determines that the channel switch is desirable. Requests to change channel can be made and propagated throughout the mesh network so that the entire mesh network can change channels instantaneously and synchronously, thereby minimizing or avoiding disruption to stations and access points.

Figure 7:
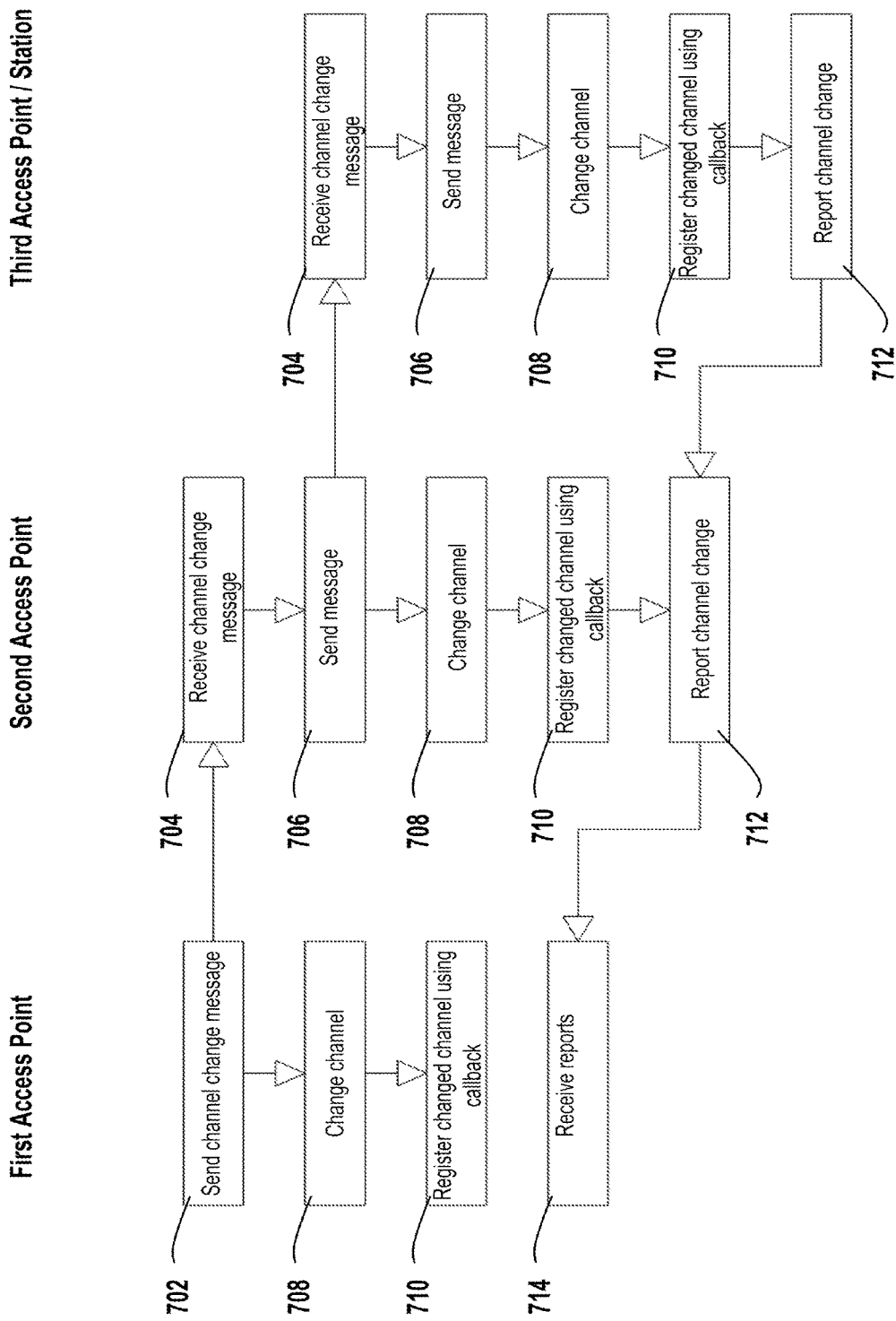
FIG. 7 illustrates an example method for performing a channel switch according to some embodiments of the present disclosure.

Turning now to FIG. 7, an example method 700 is provided for performing a channel switch according to some embodiments of the present disclosure. The illustrated embodiment represents, merely one example of a manner in which all access points and associated stations (i.e., connected devices) may switch channels in a WiFi or other wireless system, although other methods may be used. For instance, the illustrated method 700 illustrates a message that may propagate through three components (e.g., two access points and a station, three access points, etc.), although in other embodiments the method may include message propagation through any number of components, or through only two components.

The method of FIG. 7 includes a first access point sending an outgoing message in act 702. The outgoing message may include a beacon or other message prepared by, or using, an example kernel module, and can facilitate changing of channels simultaneously. For instance, the outgoing message may provide data for a channel switch, including what channel to switch to, and a timing synchronization function ("TSF"). The TSF may include a measure of time on a given device to allow all devices to change channels at the same time. The TSF may be an absolute value, or a relative value. Further, the TSF may correspond to a time sufficiently far in the future to allow messages to propagate to all access points and stations, thereby allowing all devices in the communication system to switch channels simultaneously.

A second access point may listen for a beacon or other message, and in act 704 may receive the message. In some embodiments the message sent in act 702 may be directed to the second access point in a point-to-point communication. In other embodiments, however, the message in act 702 may be sent in other manners, including as a broadcast or point-to-multipoint message. Regardless of how the message is sent in act 702, it may be recited in act 704.

The second access point may be associated with other access points or stations. As a result, the second access point may prepare and send beacons or other messages to associated devices. Upon receipt of the message in act 704, however, the second access point may add information from the received beacon to its own messages, and send the revised beacon or other message in act 706. A third access point, a station, or other device may then receive the beacon or other message in an additional act 704. If the third device is an access point, the access point may also add the received channel change information (e.g., channel and TSF) to its own messages and send the message in act 706 with the revised information. If the third device is a station, such as an end-user device, the act 706 may be omitted.

When the time associated with the TSF arrives, each of the devices may change the channel (acts 708). Thereafter, each device may register the change (acts 710). Registering the change may include each device, or each access point, calling a callback registered by the proprietary kernel module. Optionally, each device making the change can report back in acts 712 to another device to indicate that the channel change was made. The reports may ultimately be funneled back to the first device which initiated the change, and which can receive the reports in act 714.

Various elements of the method 700 may be performed in a variety of manners. For instance, the manner in which the channel change information is provided can be varied. In one embodiment, for instance, the kernel module includes proprietary structure for sending, receiving, or implementing channel changes, and the message sent can conform to such a structure. In other embodiments, a message may conform to a standard. For instance, a message may be implemented in an action frame of 802.11h channel-switch announcement (CSA) elements to allow channel changes by devices that do not have access to proprietary systems. In some embodiments, both standardized (e.g., CSA elements and action frames) may be used in addition to proprietary structures and methods. Sending both types of messages may allow devices that understand only standard messages, and devices that understand proprietary messages, to both respond and change channel synchronously. In other embodiments, however, devices receiving and interpreting only the CSA or other standard message may have some loss of timing accuracy. For instance, a CSA element may have accuracy limits based on timing accuracy limits of beacon levels in 802.11h.

The TSF function may also be the same or different for each of the access points or other devices in the method 700. If, for instance, the TSF refers to an absolute time, the TSF may remain constant as a message propagates through a network. A relative TSF may, however, be adjusted at each hop. For instance, after receiving the message in act 704, the second access point may add the TSF and channel change information in act 706, but may first adjust the TSF information. The TSF information may be adjusted by, for instance, calculating a new TSF based on the difference between time at the second access point and at the initiating, or first, access point. The adjustment may reflect the time difference resulting from the delay in receiving the message in act 704, and adding and sending the message in act 706.

While the registration in acts 710 is shown as occurring following a change in channel (acts 208) responsive to a message including channel change information from an initiating access point, the registration in acts 710 may also be performed at any suitable time. For instance, registration may be performed using a callback function regardless of why the channel changed. Thus, if the channel change was initiated locally at an access point, due to a message from a peer, due to a radar event, through a local user interface, or in some other manner, the callback may be initiated to register the channel change. Registration may include updating an index to indicate what channel is currently being used. The channel index may also be used to identify what channel to switch to in acts 708.

The method 700 of FIG. 7 includes sending of a message in act 702 by a first access point initiating a change in all access points and stations. Although a single access point may initiate the change, it should be appreciated that the initiating access point may be any access point in a system. Thus, any access point that determines a channel change should occur may act as the first access point and transmit channel change information in a corresponding beacon or other message.

Figure 8:
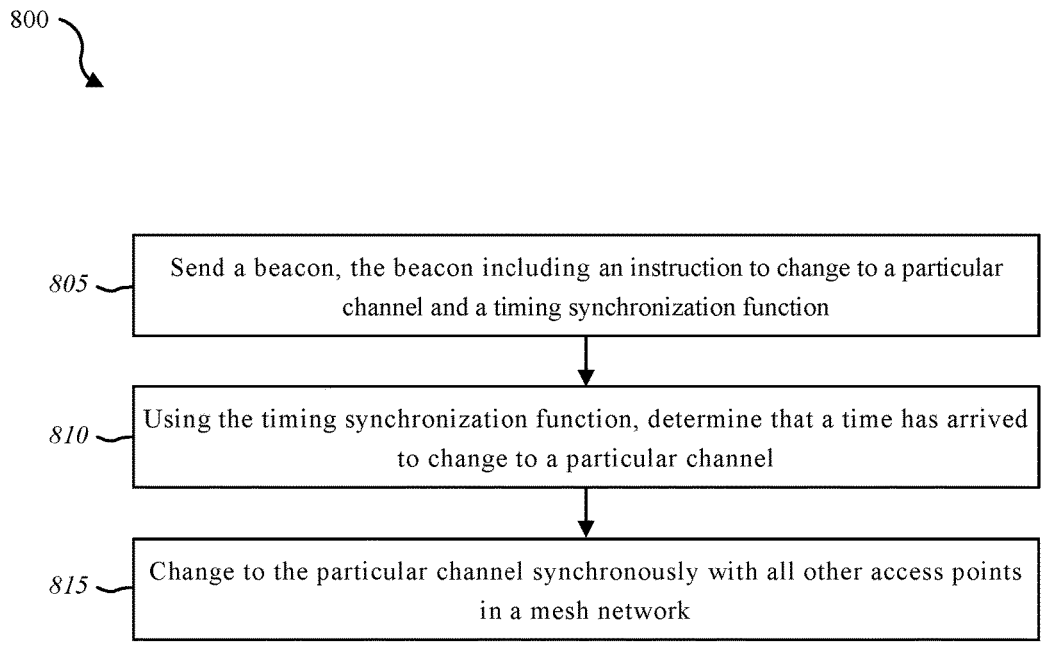
FIG. 8 is a flow diagram illustrating one embodiment of a method for simultaneous channel switching in a mesh network.

Turning now to FIG. 8, a flow diagram illustrating one embodiment of a method 800 for simultaneous channel switching in a mesh network is illustrated. In some configurations, the method 800 may be implemented in conjunction with one or more devices from the wireless networking system 100 of FIG. 1.

At block 805, a beacon may be sent. The beacon may include a channel change request in both proprietary and standard formats. The channel change request may include an instruction to change to a particular channel and a timing synchronization function identifying when the change to the particular channel should occur. At block 810, the timing synchronization function may be used to determine that the time has arrived to change to the particular channel. At block 815, the particular channel may be changed to synchronously with all other access points in a mesh network.

Figure 9:
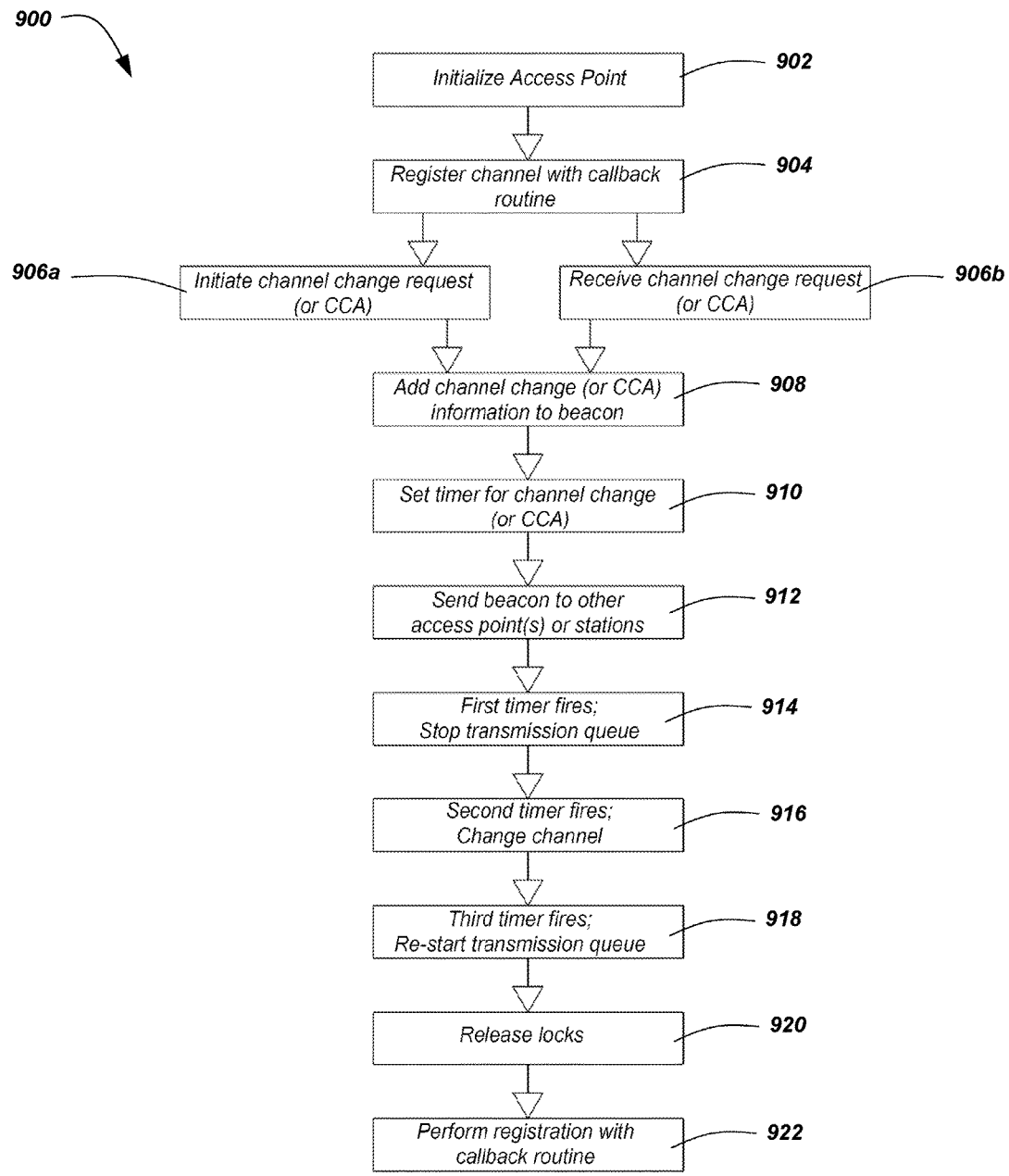
FIG. 9 illustrates another example method for performing a channel switch according to some embodiments of the present disclosure, the method of FIG. 9 further being generally applicable to a manner in which a clear channel assessment and radar detection may be performed in other embodiments of the present disclosure.

Turning now to FIG. 9, another example of a method 900 is illustrated. The method 900 may be used by an access point to switch a transmission and/or reception channel simultaneously with all other nodes and devices in a communication system.

In the method 900, the device may be initialized in act 902. Each device in the system may, upon initialization in act 900, use a callback routine (e.g., of a proprietary kernel module) in act 904 to register a channel or channel switch. Thereafter, the action taken may depend on whether the device is starting a channel change request (act 906*a*) or receiving from another access point an indication that a channel change is to occur (act 906*b*). If the access point is initializing the channel change, it may determine that a channel change is necessary or desirable. This may occur by, for instance, performing a clear channel assessment as described hereafter, although the channel switch may be determined in other manners (e.g., through a local user interface). Starting a channel change request in act 906 may include other acts, including determining what channel change to make and what time the change should occur. As discussed herein, the time at which the change is to occur should be sufficiently far in the future to allow messages to propagate through the system and allow all devices and nodes to change simultaneously.

The time function for changing channel may include a single value corresponding to the time a channel should change. This value may be absolute or relative as described herein. In other embodiments, however, multiple values may be specified. As an example, the time function determined in act 906a through triggering of a channel switch event may include: (a) determining a time when a transmission queue should be stopped; (b) a time when the channel switch should occur; and (c) determining a time when the transmission queue should resume. In some embodiments, a flag or other value may also be set to indicate whether or not the transmission queue should resume at all. If the access point performing the method 900 is not initializing the channel switch, the access point may instead receive a message in act 906b. The message may include some or all of the information discussed above relative to act 906a, including channel identification information, a time to switch channels, how long before and after the switch to stop and resume the transmission queue, and flags (e.g., whether to resume the transaction queue at all). Some channels (e.g., channels needing CAC, the flag may be set not to resume the transmission queue).

Regardless of whether the access point is initiating the channel change (i.e., performing act 906a) or receiving a message indicating a channel change should occur (i.e., performing act 906b), the access point may add channel change information to an outgoing beacon message in act 908. An initiating access point may add the information to a new beacon, whereas a receiving access point may add received information to its own beacon. As discussed herein, the time information may be changed by a receiving access point to indicate relative times for changing a channel. Such relative times may be changed to account for the time to receive and send a new beacon with the channel change information.

Adding the information in act 908 may also include adding channel change information in one or more manners. For instance, channel change information may be formatted according to a custom or proprietary structure of a kernel module. Other channel change information may be formatted according to a standard protocol. In some embodiments, adding the information in act 908 includes adding channel change information in both proprietary and standard formats so that channel change information may be understood by access points and devices that understand either standard. While FIG. 9 illustrates an act 908 of adding channel change information, in some embodiments the method 900 may be carried out by a station rather than an access point. In such an embodiment, the station may not send out beacons, and the act 908 may be skipped.

Once an access point knows the channel change information, whether following determining the information and triggering a channel change in act 906a, or after receipt of a channel change message in act 906b, the access point can set a timer in act 910 to cause the channel change to occur. Setting the timer in act 910 may include setting up an input and output control ("IOCTL") with relevant information for changing channels. The relevant information include what channel to change to and the time of the change. Other relevant information may include how long before and after the switch to stop and resume transmission queues, whether to resume a transmission queue at all, etc.

Before or after setting the time in act 910, the access point may also send a beacon that includes channel change information (act 912). Sending the channel change information may also include transmitting the message with the proprietary (e.g., according to proprietary kernel module) and/or standard (e.g., according to 802.11h CSA standard) to propagate the message to other devices. A receiving module may then receive the message in an act 906b and follow a method similar to the remainder of method 900.

The timer set in act 910 may fire at appropriate times based on the information used. In method 900, three timers may be set. These timers may fire at appropriate times and corresponding actions may take place. After time passes and a first timer fires in act 914, the method may include stopping a transmission queue. Stopping the transmission queue can be a pre-change event, and can optionally stop a reception queue as well. Completion of these tasks may be reported to the local host through an interrupt, which can stop radar when the timer fires in act 914.

When the second timer fires in act 916, it may indicate a time to switch channels. As a result, the system may change channel/frequency to the specified channel, and inform the local host (e.g., through an interrupt). At that time the local host may also restart radar if necessary. Data structures (e.g., an 802.11 com data structure) can be updated with the current channel information. After that time, the third timer can fire in act 918. The third timer can trigger restarting of the transmission queue, and a notification to the local host through an interrupt or other manner.

If any locks have been set, the locks may also be released in act 920, and work can be restarted to mark the process as complete. A registration procedure may also be performed in act 922. The registration procedure may include calling of a callback. The callback can be registered in some embodiments by a proprietary kernel module to complete the channel change procedure. Optionally, completed information may be reported to other access points, although in some embodiments the registration may be maintained only locally.

Clear Channel Assessment

The above discussion related to fast channel switching describes an embodiment of the present disclosure in which an access point of a mesh network may initiate a channel change by sending one or more messages to other access points, and allowing the other access points to propagate the message through the mesh network to all access points and stations. The following discussion relates to when and how the initiating access point may determine that a channel change is desirable. Accordingly, aspects disclosed below relating to clear channel assessment may be included within the method 900 of FIG. 9, or in another suitable method. In accordance with one embodiment, aspects of clear channel assessment may be inserted between acts 904 and 906a.

A clear channel assessment may be performed in a number of manners, and can include various features. According to one embodiment, the clear channel assessment feature can include clear channel assessment ("CCA") and radar detection. Using radar detection, sample signals may be collected to determine if radar is detected on a particular channel. That information may then be provided to the caller, whether the caller is local on an access point, or is remote in another access point. The caller can then determine to take appropriate action. For instance, if radar is detected on a channel, the action may be to change channels immediately (or to propagate a message to change channels as quickly as possible.

Generally speaking CCA can be used to measure the status of a chipset and determine whether one or more channels are available should a current channel be degrading. In one embodiment this may be performed by monitoring the status of an RF chipset. By way of illustration, a channel, and potentially a secondary channel, may be monitored and associated with a particular bit. If the RF power on a respective channel is below a predetermined threshold, the bit is asserted for the respective channel. Different values may thus be provided if the channel, or secondary channel, is clear as opposed to when the channel is not clear. While sampling may occur a single time, other embodiments contemplate sampling multiple times over a time period. Sampling multiple times over a given time period allows an access point or station to gather more information about the activity on a particular channel. The inverse proportion of samples where the bit was asserted can give a measurement of how busy the channel is. A relatively busy channel may be less desirable as a target channel for a channel switch as compared to a relatively inactive channel.

It should be noted that when a channel/frequency is monitored, a device may temporarily change to the channel to be monitored. Where sampling is performed multiple times over a longer period of time, the device may repeatedly and temporarily change to the sampled channel, then change back to the current channel. Optionally, radar detection may be done during the same CCA sampling period. Signal pulse samples may be collected to determine whether or not radar is present. Particularly where each sampling period is short, the use of multiple samples provides a greater ability to detect whether or not radar is present on the channel. Over time, data may be obtained for the particular channel being tested to determine its availability and usage, and if multiple channels are sampled, a range of usage data for all channels may be collected.

When other channels are available that provide more accessibility than a current channel, the initiating access point may initiate a channel switch as described above. The switch may be based on usage information collected at each of multiple access points and/or stations, rather than at a single device. Thus, each component in a mesh network may perform CCA and radar detection. Those results may be aggregated by an initiating access point to determine how each access point and station may respond to a particular channel change.

In assessing a channel, CCA requests may be propagated to access points through a process similar to that described previously for a channel change. Thus, a process may include sending a proprietary and/or standard message to one or more other access points. The message may include information about which channel to test, the time to test the channel, and the like. In some embodiments, the process is similar but uses a different proprietary interface of a kernel module that also may describe information such as the length of a sample and the overall duration during which multiple samples are to be taken, in addition to information about the channel or channels to sample, and the times for sampling to occur.

Because a message may be propagated with time information, each of the access points may simultaneously test and measure activity on another channel. A callback routine may be used to then report and register the results with the access point, and the access point can then provide the information to others and to higher level software for collection. The higher level software or other devices may determine when a channel change should be made based on the collective, simultaneously obtained CCA and radar information from all access points in a network. In some embodiments, the output from a CCA and radar measurement may include: (a) the starting time; (b) the ending time; (c) the number of samples where a CCA bit is asserted for a primary channel; (d) the number of samples where a CCA bit is asserted for the secondary channel; (e) the number of times an interface iterated to collect samples; and (f) a Boolean value for whether or not radar was detected at some point during the sampling.

Sampling of channels for clear channel assessment purposes may also use similar information with respect to a TSF as that used by an access point during a channel switch. For instance, a custom interface may be provided on a beacon. The custom, proprietary interface may provide information such as timing on when to stop a transmission or receiving queue, when to change channel for sampling purposes and to collect sampling data, how often to repeat the sampling, how long each sample should be and the total time over which samples should be taken, when to restart a transmission and/or receiving queue, and the like. Various timers may therefore fire as shown in FIG. 9, which timers may include timers related to stopping and restarting a queue, and changing a channel. Such timers may also be iterated to allow sampling to occur multiple times over a longer period. In at least one embodiment, it is contemplated that no prior time is used or specified to stop a queue. Instead, the queue may be stopped at the time a channel change occurs, rather than before.

Although not intended to be limiting of the present disclosure, one embodiment contemplates issuing a command as an IOCTL to a driver to fetch CCA information on a channel. An example format of such a command may include:

call_qcsapi start_cca wifi0 44 40

Using this format, the driver may cause CCA information to be fetched on channel 44 for a duration of 40 milliseconds. In some embodiments, the duration may be a total duration during which a channel should change to perform a CCA test. If, for instance, it takes 20 milliseconds to perform a channel change, that may then leave only 20 milliseconds for the sampling period to occur.

Channel Scan

The above disclosure related to clear channel assessment contemplates the use of a proprietary or custom interface to propagate messages to test channel availability on one channel and potentially a secondary channel. Each device can perform the test at the same time. In other embodiments, however, sampling a channel may occur as part of a scanning process during which multiple channels may be sampled. Each of multiple channels may be sampled multiple times. The process may then iterate with additional channels to build up a scan table for all channels. The initiating access point may also issue custom and proprietary messages that allow for scanning. Such messages may include the same information used for scanning a single channel and/or secondary channel, but may also include information such as the number of additional channels to scan, an identification of the additional channels, timing information for the other channels, and the like.

As a scanning procedure may take longer than a scan of a single channel, an access point may dedicate its resources to sampling, and be off of a primary channel used for communication for a period of time. As the access point may not always remain connected to the primary channel, some packets can be lost, however, the access point and stations may remain associated. As with sampling a single channel, sampling may be done while accounting for time to switch channels. Such an accounting may include the time to change channels as well as a limitation on the cycles used. If too many cycles are used, the device software may trigger a reset, and limits on cycling may be used to avoid the reset.

In view of the above description, it should be appreciated that systems, devices, and methods of the present disclosure may allow an access point in a mesh network to determine that a channel change is desirable (e.g., using CCA collected from multiple nodes, radar detection, etc.), and propagate a message to all nodes for simultaneously changing the channel to avoid loss of data packets or disassociation between nodes and stations. Embodiments of the present disclosure may comprise or utilize a special purpose or general-purpose computer including computer hardware, such as, for example, one or more processors and system memory in an access point, a server, switch, or computing device, an end-user device, or in other systems or components.

Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media. Computer-readable media that includes computer-executable instructions may also be referred to as a computer program product.

Examples of computer storage media include RAM, ROM, EEPROM, CD-ROM or other optical disk storage, magnetic disk storage or other magnetic storage devices, flash-based storage, solid-state storage, or any other physical, non-transmission medium which can be used to store desired program code means in the form of computer-executable instructions or data structures and which can be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media can include a communication network and/or data links, carrier waves, wireless signals, and the like, which can be used to carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, dedicated or special purpose computer (e.g., an access point), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, mesh network access points or nodes, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using one or more network, wireless, hardwire, or other connections, or any combination thereof. Examples may include residential or commercial buildings in connection with a mesh network providing access to a service provider (e.g., an ISP).

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. Any feature illustrated or described relative to one embodiment is interchangeable and/or may be employed in combination with features of any other embodiment herein. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A method for channel switching at a first access point in a wireless network, comprising:
   receiving a first beacon from a second access point in the wireless network that indicates a request to make a channel change, the first beacon containing channel change information indicating:
   an identification of a channel to change; and
   a first change time to make the channel change;

setting a timer to change to the channel at the first change time;
generating a second beacon by revising an outgoing beacon to include the channel change information from the first beacon; and
sending, to a third access point, the second beacon indicating a request for the third access point to make the channel change and containing the channel change information.

2. The method of claim 1, wherein the request to make the channel change is based on receiving the request for a clear channel assessment (CCA) from the second access point.

3. The method of claim 2, further comprising:
performing a CCA based on the request to perform the CCA;
register an indication of results of the CCA; and
transmitting the indication of the results of the CCA to the second access point.

4. The method of claim 1, further comprising:
sending the second beacon to at least one node connected in the wireless network that is different than the second access point and the third access point, wherein the second beacon requests that the at least one node make a channel change at the first change time.

5. The method of claim 1, wherein receiving the first beacon further comprises:
receiving the first beacon using a point-to-point communication with the second access point.

6. The method of claim 1, wherein receiving the first beacon further comprises:
receiving the first beacon, from the second access point, using a point-to-multipoint communication or a broadcast communication.

7. The method of claim 1, further comprising:
transmitting a first indication to at least one device associated with the wireless network to change to the identified channel when the first change time occurs.

8. The method of claim 7, further comprising:
receiving a second indication that the change to the identified channel was made based at least in part on the first indication.

9. The method of claim 1, wherein the first beacon received indicating the request to make the channel change is received in a proprietary format.

10. The method of claim 1, wherein the first change time corresponds to an instruction to stop a transmission queue, the method further comprising:
receiving a second change time;
switching to the identified channel at the second change time;
receiving a third change time; and
restarting the transmission queue at the third change time.

11. An apparatus for channel switching, comprising:
a processor;
memory in electronic communication with the processor; and
instructions stored in the memory, the instructions being executable by the processor to:
receive a first beacon, at the apparatus in a wireless network, from a second access point in the wireless network that indicates a request to make a channel change, the first beacon containing channel change information indicating:
an identification of a channel to change to; and
a first change time to make the channel change;
set a timer, at the apparatus, to change to the channel at the first change time;
generate a second beacon by revising an outgoing beacon to include the channel change information from the first beacon; and
send, to a third access point, the second beacon indicating a request for the third access point to make the channel change and containing the channel change information.

12. The apparatus of claim 11, wherein the request to make the channel change is based on receiving the request for a clear channel assessment (CCA) from the second access point.

13. The apparatus of claim 12, the instructions being further executable to:
perform a CCA based on the request to perform the CCA;
register an indication of results of the CCA; and
transmit the results of the CCA to the second access point.

14. The apparatus of claim 11, the instructions being further executable to:
send the second beacon to at least one node connected in the wireless network that is different than the second access point and the third access point, wherein the second beacon requests that the at least one node make a channel change at the first change time.

15. The apparatus of claim 11, wherein when the processor receives the first beacon, the instructions are further executable to:
receive the first beacon using a point-to-point communication with the second access point.

16. The apparatus of claim 11, wherein when the processor receives the first beacon, the instructions are further executable to:
receive the first beacon, from the second access point, using a point-to-multipoint communication or a broadcast communication.

17. The apparatus of claim 11, wherein the first change time corresponds to an instruction to stop a transmission queue, the instructions being further executable to:
receive a second change time;
switch to the identified channel at the second change time;
receive a third change time; and
restart the transmission queue at the third change time.

18. A non-transitory computer-readable medium storing computer-executable code at a first access point in a wireless network, the code executable by a processor to:
receive a first beacon from a second access point in the wireless network that indicates a request to make a channel change, the first beacon containing channel change information indicating:
an identification of a channel to change to; and
a first change time to make the channel change;
set a timer to change to the channel at the first change time;
generate a second beacon by revising an outgoing beacon to include the channel change information from the first beacon; and
send, to a third access point, the second beacon indicating a request for the third access point to make the channel change and containing the channel change information.

19. The non-transitory computer-readable medium of claim 18, the code further executable to:
perform a CCA based on a request to perform the CCA, the request received from the second access point;
register an indication of results of the CCA; and
transmit the results of the CCA to the second access point.

* * * * *